US010696859B2

(12) United States Patent
Kasperchik et al.

(10) Patent No.: US 10,696,859 B2
(45) Date of Patent: Jun. 30, 2020

(54) WHITE INKS

(71) Applicant: Hewlett-Packard Development Company, L.P., Fort Collins, CO (US)

(72) Inventors: Vladek Kasperchik, Corvallis, OR (US); Alexey S. Kabalnov, San Diego, CA (US); David Michael Ingle, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 64 days.

(21) Appl. No.: 15/741,973

(22) PCT Filed: Sep. 15, 2015

(86) PCT No.: PCT/US2015/050208
§ 371 (c)(1),
(2) Date: Jan. 4, 2018

(87) PCT Pub. No.: WO2017/048238
PCT Pub. Date: Mar. 23, 2017

(65) Prior Publication Data
US 2018/0194959 A1 Jul. 12, 2018

(51) Int. Cl.
| *C09D 11/00* | (2014.01) |
| *C09D 11/54* | (2014.01) |
| *B41M 5/00* | (2006.01) |
| *C09D 11/322* | (2014.01) |
| *C09D 11/38* | (2014.01) |
| *C09D 11/106* | (2014.01) |
| *B41M 7/00* | (2006.01) |
| *C09D 11/033* | (2014.01) |
| *C09D 11/037* | (2014.01) |
| *C09D 11/08* | (2006.01) |
| *C09D 11/107* | (2014.01) |

(52) U.S. Cl.
CPC ............ *C09D 11/54* (2013.01); *B41M 5/0017* (2013.01); *B41M 5/0023* (2013.01); *B41M 5/0047* (2013.01); *B41M 5/0064* (2013.01); *B41M 7/009* (2013.01); *C09D 11/033* (2013.01); *C09D 11/037* (2013.01); *C09D 11/08* (2013.01); *C09D 11/106* (2013.01); *C09D 11/107* (2013.01); *C09D 11/322* (2013.01); *C09D 11/38* (2013.01); *B41M 7/0018* (2013.01)

(58) Field of Classification Search
CPC ..... C09D 11/54; C09D 11/033; C09D 11/037; C09D 11/08; C09D 11/107; C09D 11/322; C09D 11/106; C09D 11/38; B41M 5/0017; B41M 5/0023; B41M 5/0064; B41M 5/0047; B41M 7/009
USPC .................................................. 523/201, 200
See application file for complete search history.

(56) References Cited

U.S. PATENT DOCUMENTS

| 5,053,441 | A | 10/1991 | Biale | |
| 5,750,200 | A | 5/1998 | Ogawa et al. | |
| 7,122,078 | B2 | 10/2006 | Frese et al. | |
| 7,901,501 | B2 | 3/2011 | Kobayashi | |
| 8,784,550 | B2 * | 7/2014 | Kasperchik | B82Y 30/00 106/31.65 |
| 8,927,623 | B2 | 1/2015 | Goto | |
| 10,167,400 | B2 * | 1/2019 | Bruinsma | C09D 11/102 |
| 10,167,406 | B2 * | 1/2019 | Bruinsma | C09C 1/00 |
| 10,465,085 | B2 * | 11/2019 | Kasperchik | C09C 3/10 |
| 10,472,530 | B2 * | 11/2019 | Kasperchik | C09C 3/063 |
| 10,553,106 | B2 * | 2/2020 | Jeon | G08C 17/02 |
| 2003/0212192 | A1 | 11/2003 | Yuan et al. | |
| 2007/0060670 | A1 | 3/2007 | Ellis | |
| 2009/0169765 | A1 * | 7/2009 | Nakamura | C09D 11/101 427/511 |
| 2010/0222492 | A1 | 9/2010 | Sarkisian et al. | |
| 2013/0160672 | A1 | 6/2013 | Kasperchik | |
| 2014/0118449 | A1 | 5/2014 | Sarkisian et al. | |
| 2018/0086933 | A1 * | 3/2018 | Kasperchik | C09C 1/3661 |
| 2018/0100078 | A1 * | 4/2018 | Kasperchik | C09C 3/063 |
| 2018/0105714 | A1 * | 4/2018 | Kasperchik | C09C 3/006 |

FOREIGN PATENT DOCUMENTS

| WO | 9311181 | 6/1993 |
| WO | 9728198 | 8/1997 |
| WO | 2014193387 | 12/2014 |

OTHER PUBLICATIONS

International Search Report dated Nov. 24, 2015 for PCT/US2015/050208, Applicant Hewlett-Packard Company, L.P. Development.
Bleeker et al., Interpretation and implications of the European Commission Recommendation on the definition of nanomaterial, National Institute for Public Health and the Environment, Ministry of Health, Welfare and Sport, RIVM Letter report 601358001, 2012, 45 pages.

* cited by examiner

*Primary Examiner* — Hannah J Pak
(74) *Attorney, Agent, or Firm* — Thorpe North & Western LLP

(57) ABSTRACT

A white ink can include an aqueous liquid vehicle, from 5 wt % to 70 wt % of a white metal oxide pigment having an average primary particle size from 5 nm to less than 100 nm, and from 0.005 to 10 wt % dispersant associated with a surface of the white metal oxide pigment. The white ink can also include from 2 wt % to 30 wt % core-shell latex particulates.

16 Claims, 5 Drawing Sheets

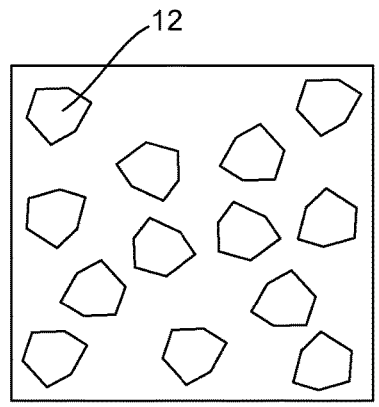
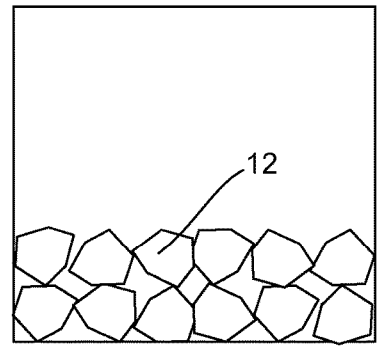
FIG. 1A          FIG. 1B
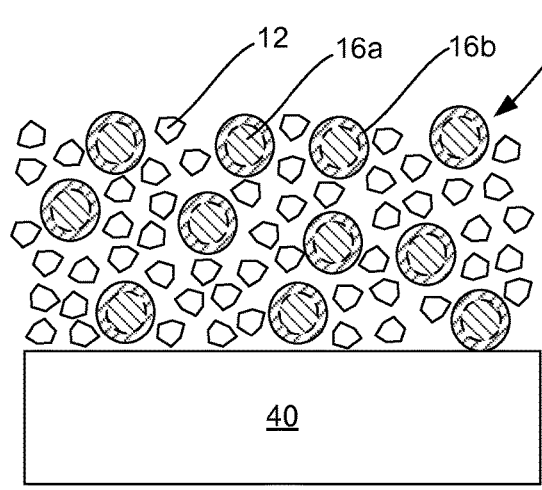
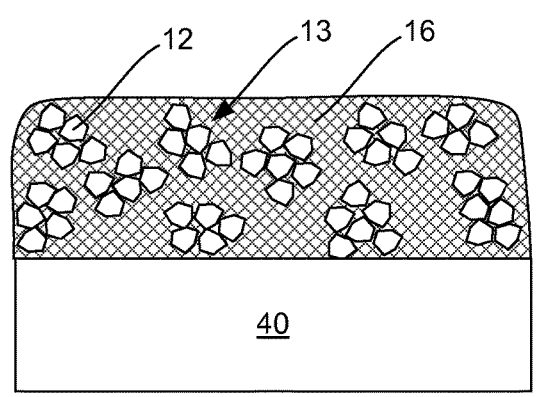
FIG. 2A          FIG. 2B

WHITE INKS

BACKGROUND

The use of ink-jet printing systems has grown dramatically in recent years. This growth may be attributed to substantial improvements in print resolution and overall print quality coupled with appreciable reduction in cost. Today's ink-jet printers offer acceptable print quality for many commercial, business, and household applications at lower costs than comparable products available just a few years ago. Notwithstanding their recent success, research and development efforts continue toward improving ink-jet print quality over a wide variety of different applications, but there remain challenges. In one instance, certain pigments can be more challenging than other in achieving certain desirable properties. For example, with certain pigments that often utilize a higher pigment load, e.g., white, there can be problems of jetting reliability and print quality, particularly with thermal inkjet imaging applications on non-porous substrates. More specifically, decap, kogation, and pigment settling problems can arise when jetting high pigment load inks.

BRIEF DESCRIPTION OF THE DRAWINGS

Additional features and advantages of the disclosure will be apparent from the detailed description which follows, taken in conjunction with the accompanying drawings, which together illustrate, by way of example, features of the present technology.

FIG. 1A depicts white metal oxide pigment particles dispersed in a fluid, and FIG. 1B depicts settling that can occur with white metal oxide pigment particles, such as $TiO_2$, over a short amount of time;

FIG. 2A depicts core-shell latex particulates and white metal oxide pigment particles printed on a media substrate in accordance with examples of the present disclosure;

FIG. 2B depicts core-shell latex particulates and white metal oxide pigment particles printed on a media substrate and fused or cured in accordance with examples of the present disclosure;

Figure 3:
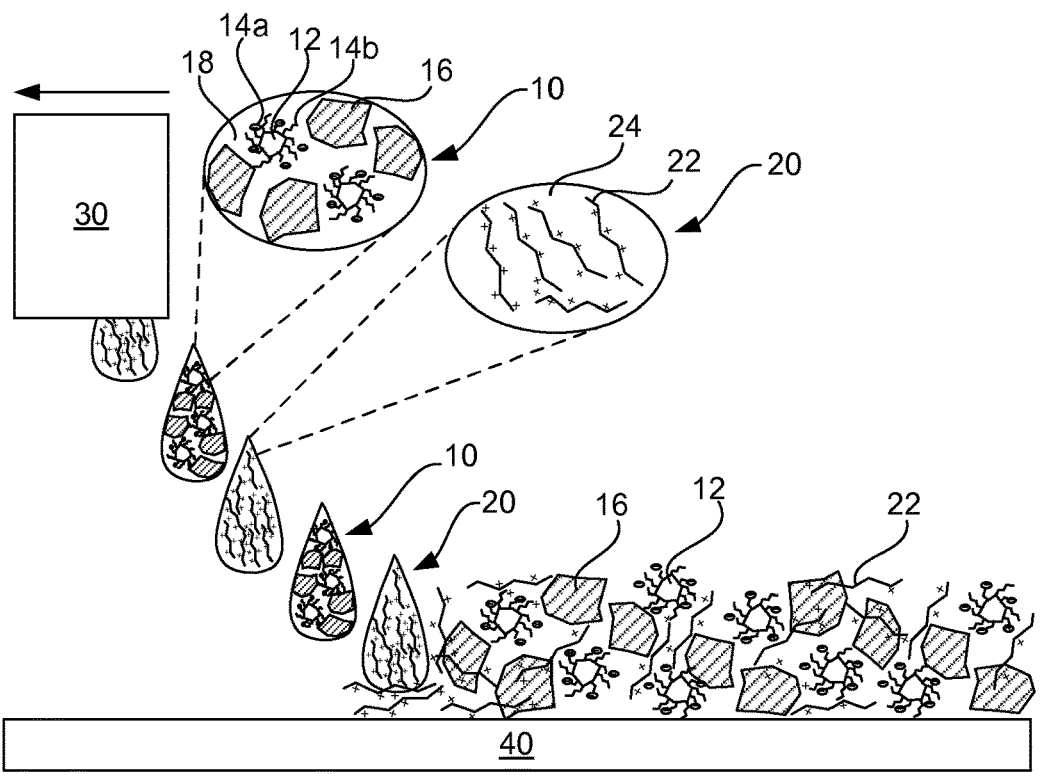
FIG. 3 depicts examples where a cationic polymer formulation is digitally printed on a media substrate contemporaneously or just before printing a white inkjet ink thereon, wherein the white inkjet ink is prepared in accordance with examples of the present disclosure.

Reference will now be made to the exemplary embodiments illustrated, and specific language will be used herein to describe the same. It will nevertheless be understood that no limitation of the scope of the disclosure is thereby intended.

DETAILED DESCRIPTION

The present disclosure is drawn to white inks that can be jetted from various types of inkjet printheads, but which can also be particularly friendly for use in thermal inkjet printheads. These inks, in some instances with the assistance of a fixer coating layer or fixer ink, can be printed not only on porous media, but also effectively on more challenging non-porous polymer media.

In certain white inks, there can be advantages to using relatively large white metal oxide pigment particles (e.g., 100 nm to 2 µm) at a high pigment load (e.g., 5 wt % to 50 wt %, or 10 wt % to 30 wt %) for ink layers that are relatively thick (e.g., up to 80 gsm). Advantages can include providing high hiding power when printing with white inks on colored substrates, e.g., ink thickness, high pigment load, and/or light scattering of pigment particles enhances ink hiding power on darker substrates. That being stated, having such a high pigment load and large pigment sizes in inkjet ink formulations can interfere with reliable jetting in some instances, particularly with small drop weight thermal inkjet printheads. Typical failures include formation of solid pigment plugs inside or on top of printhead nozzles caused by ink drying (also know as decap or crusting), which leads to print start-up issues, e.g. there is often striping that may occur at startup. There can be an accumulation of thick pigment residue on surface of the small heaters that are present in the firing chamber of inkjet printhead, which can lead to severe drop velocity decay over time (also known as kogation). Also, fast settling of large and heavy pigment particle in the ink-feeding channels of the inkjet-printing device may cause irreversible plugging of them and render the device unusable.

Thus, in accordance with examples of the present disclosure, white ink formulations, methods, and fluid sets that avoid some of these problems can be prepared that utilize smaller white metal oxide pigment particles that traditionally may not have been used for white opaque imaging. For example, a white ink can include an aqueous liquid vehicle, and from 5 wt % to 70 wt % of a white metal oxide pigment having an average primary particle size from 5 nm to less than 100 nm. The white ink can further include from 0.005 to 10 wt % dispersant associated with a surface of the white metal oxide pigment, and from 2 wt % to 30 wt % core-shell latex particulates. In one example, the shell has a higher glass transition temperature (Tg) than the core. In another example, the shell has a greater affinity for other core-shell latex particulates than the white metal oxide pigment.

In certain specific examples, the white metal oxide pigment can have an average primary particle size from 15 nm to 80 nm, or from 40 nm to 70 nm. In still further specific examples, the white metal oxide pigment can be or include titanium dioxide particulates, zinc oxide particulates, zirconium oxide particulates, or a combination thereof. With specific reference to the core-shell latex particulates, these particulates can have an average glass transition temperature (Tg) from −20° C. to 130° C., with the shell having a higher glass transition temperature than the core, e.g., core ranging from −20° C. to 30° C. or from −20° C. to 0° C. and the shell ranging from 30° C. to 130° C. or from 70° C. to 130° C. In one example, the core-shell latex particulates can be present in the white ink at a white metal oxide pigment to core-shell latex particulate weight ratio from 10:1 to 1:5, or in another example, at a weight ratio from 5:1 to 1:2. In another example, the volume ratio of white metal oxide pigment to core-shell latex particulate can be from 90:10 to 30:70. With specific reference to the dispersant, this component can include a short-chain anionic dispersant having a weight average molecular weight ranging from 1,000 Mw to 30,000 Mw, a non-ionic or predominantly non-ionic dispersant having an acid number not higher than 100 mg KOH/g, a non-ionic or predominantly non-ionic dispersant having an acid number not higher than 30 mg KOH/g and a C2 to C10 carboxylic acid having two or more carboxylic groups, or combinations thereof.

In another example, a method of making a white ink can include milling a slurry including from 5 wt % to 70 wt % of a white metal oxide pigment in an aqueous liquid vehicle with dispersant resulting in white metal oxide pigment dispersion having white metal oxide pigment particles having an average primary particle size ranging from 5 nm to less than 100 nm. The method can further include admixing water, organic co-solvent, and core-shell latex particulates with white metal oxide pigment dispersion. In one example, the shell has a higher glass transition temperature (Tg) than the core. In another example, the shell has a greater affinity for other core-shell latex particulates than the white metal oxide pigment.

In one example, with this method, the white metal oxide pigment particles can become associated with the dispersant during milling. In another example, the white metal oxide pigment can be present at from 5 wt % to 50 wt % of the ink, and the average primary particle size of the white metal oxide pigment particles can be from 15 nm to 80 nm. In another example, the core-shell latex particulates can be present at from 2 wt % to 30 wt % in the white ink, and/or furthermore, the core-shell latex particulates can have a glass transition temperature from −20° C. to 130° C., with the shell having a higher glass transition temperature than the core, e.g., core ranging from −20° C. to 30° C. or from −20° C. to 0° C. and the shell ranging from 30° C. to 130° C. or from 70° C. to 130° C. The step of milling the slurry can also include milling sufficiently to reduce an average aggregate particle size of the white metal oxide pigment and expose new surfaces of the white metal oxide primary pigment particles to the slurry so that the dispersant(s) becomes immediately absorbed or adsorbed on a surface of the white metal oxide pigment.

In still another example, a fluid set for inkjet imaging can include a white ink and a fixer fluid. The white ink can include an aqueous liquid vehicle, from 5 wt % to 70 wt % of a white metal oxide pigment having an average primary particle size from 5 nm to less than 100 nm, from 0.005 to 10 wt % dispersant associated with a surface of the white metal oxide pigment, and from 2 wt % to 30 wt % core-shell latex particulates. The fixer fluid can include an aqueous fixer vehicle, and from 0.1 wt % to 25 wt % cationic polymer.

With this fluid set, in one example, the white ink can be formulated for inkjet application and the fixer fluid can be formulated for inkjet application having a viscosity from 1 cP to 35 cP at 25° C. In another example, the white ink can be formulated for inkjet application and the fixer fluid can be formulated for analog application having a viscosity from 1 cP to 500 cP at 25° C. In still further detail, in one example, the white metal oxide pigment can have an average primary particle size from 15 nm to 80 nm and can be selected from titanium dioxide particulates, zinc oxide particulates, zirconium oxide particulates, or combinations thereof. The white metal oxide pigment and core-shell latex particulates can be present in the white ink at a weight ratio from 10:1 to 1:5. Furthermore, in one example, the dispersant can include a short-chain anionic dispersant having a weight average molecular weight ranging from 1,000 Mw to 30,000 Mw, a non-ionic or predominantly non-ionic dispersant having an acid number not higher than 100 mg KOH/g, a non-ionic or predominantly non-ionic dispersant having an acid number not higher than 30 mg KOH/g and a C2 to C10 carboxylic acid having two or more carboxylic groups, or combinations thereof.

These white inks and methods can be used in forming white images on various media substrate, including smooth polymer (non-porous) media substrate, and can be printed in combination, as mentioned, with a fixer coated on the surface of the media. For example, a fixer with cationic polymer can be applied to the media substrate and can be formulated so that its cationic polymer interacts with any anionically charged components in the white ink to immobilize the white metal oxide pigment. In this example, the anionically charged component can include dispersant that is absorbed or adsorbed on the surface of the milled white metal oxide pigment surface, as well as the surface of the core-shell latex particulates.

Turning now to the FIGS., the white inks of the present disclosure address issues related to system reliability and print opacity performance of white inks, even though the colorants are relatively small white metal oxide pigment particles. To illustrate, high bulk density of white metal oxide pigment, such as $TiO_2$, which typically have a relatively large particle size, e.g., from 100 nm to 2000 nm, from 150 nm to 750 nm, or from 200 nm to 500 nm, can be used to provide high opacity performance. However, the high bulk density, e.g., about 4.2 for the rutile form, and large size also can result in fast settling of the pigment in low viscosity water-based inkjet ink formulations. More specifically, white metal oxide particles 12 (See FIG. 1A) printed on a media substrate 40 can easily agglomerate resulting in a sediment that is difficult to break apart, e.g., layers with very strong white metal oxide particle 12 inter-particle cohesion is formed (See FIG. 2B). This can clog fluidic pathways of ink delivery systems and inkjet printheads, rendering the printing device non-operational within few days in some instances.

In accordance with examples of the present disclosure, because the white metal oxide particles used are smaller in size, various problems related to inkjet printing reliability can be alleviated. For example, as shown in FIG. 2A, smaller white metal oxide particles 12 can be assisted in their suspension properties because of Brownian motion (whereas larger particles do not tend to benefit from this property). Because these particles tend to stay suspended more fully than larger particles, problems associated with kogation, clogging of ink channels, etc. can be avoided. That being stated, as these particles are small, they do not tend to scatter light as well as larger particles. Improving light scattering properties of these smaller particles can be achieved in accordance with examples of the present disclosure by co-dispersing these small white metal oxide pigment particles with a core-shell latex 16, which includes a core 16a and a shell 16b. In this example, the shell may have a higher glass transition temperature (Tg) than the core and the core-shell latex particulates individually may have a higher affinity in the ink for one another than the white metal oxide particulates. Because of the nature of these core-shell latex particulates that are co-dispersed with the small white metal oxide particles, upon drying and fusing ink printed layers prepared with these inks, the core-shell latex particulates 16 in their fused state, as shown in FIG. 2B, tend to push the small white metal oxide pigment particles together to form larger aggregates 13. Larger aggregates formed after printing do not tend to have the problems associated with printer clogging (because the aggregates form after printing), and the larger sized aggregates acceptably scatter light to generate a white, opaque image, e.g., they cause more desirable/enhanced light scattering properties. In other words, even though the ink when printed has very low opacity in liquid state, after drying and curing, opacity of the printed coating is increased dramatically as the latex coalescence into a continuous phase pushes small pigment particles with low light-scattering cross-section into larger multi-particle clusters. These clusters act like in situ-created high refractive index domains which are large enough to dramatically increase opacity of the print.

Figure 4:
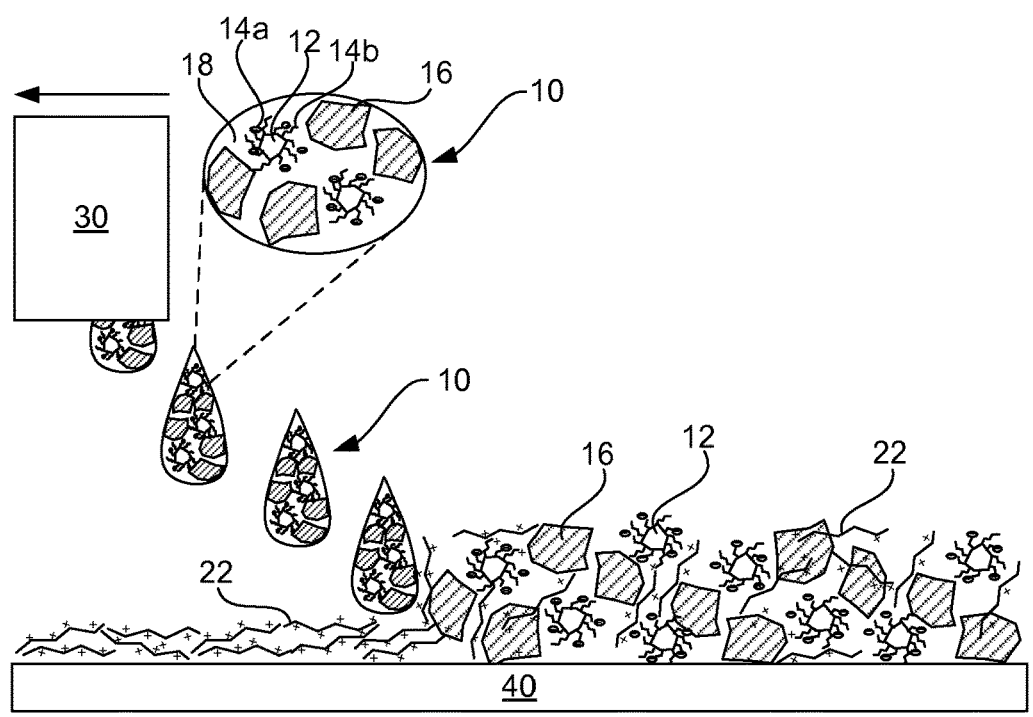
FIG. 4 depicts examples where a cationic polymer is applied to a media substrate prior to (either digital or by analog application) printing a white inkjet ink thereon, wherein the white inkjet ink is prepared in accordance with examples of the present disclosure.

FIG. 3 depicts an example where a digitally printed fixer is applied just prior to or essentially simultaneously with an inkjet ink of the present disclosure. FIG. 4 depicts an example where a fixer is applied to a media substrate prior to application of an inkjet ink. The fixer in this latter example can likewise be applied by digital printing, or alternatively, by analog application, e.g., roller, curtain coating, blade coating, Meyer rod coating, or any other coating methodology suitable for producing thin layer of fixer on the printed substrate, etc.

As shown in FIGS. 3 and 4, an inkjet printing device 30 is adapted to digitally print a white inkjet ink 10, and in some examples, a fixer composition 20 on a media substrate 40. The media substrate can be a smooth, non-porous polymer substrate that is otherwise difficult to print on with high image quality and high durability. Specifically, FIG. 3 shows the fixer composition being printed digitally from the printing device, and FIG. 4 shows the fixer composition being pre-applied to the media substrate, either digitally or by an analog coating method. In both examples, the white inkjet ink includes white metal oxide pigment 12 particles that are co-dispersed with both short-chain anionic dispersant 14a, and non-ionic or predominantly non-ionic dispersant 14b, though only one dispersant packages may be alternatively used, or different dispersant(s) can be used, e.g., non-ionic or predominantly non-ionic dispersant with a C2-C10 carboxylic acid with two or more carboxylic acid groups. The white ink can further include latex particulates 16 (which are core-shell latex particulates, as previously shown and described), and a liquid vehicle 18 which typically includes water, organic solvent, and/or other ingredients can be conventionally present. In further detail, a fixer composition can include cationic polymer 22 that is interactive with the surface of the white pigment, e.g., short-chain anionic dispersant, or other anionic components that may be found in the white ink, thereby providing some immobilization or freezing of the pigment and particles on the print media substrate.

Figure 5:
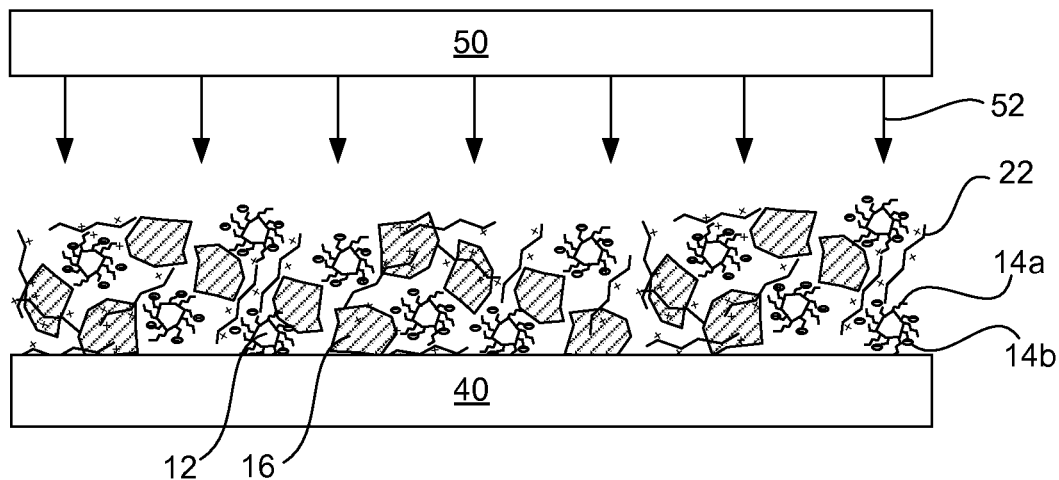
FIG. 5 depicts examples of heat drying and fusing an image printed in as described in FIG. 3 or 4 in accordance with examples of the present disclosure.
Figure 6:
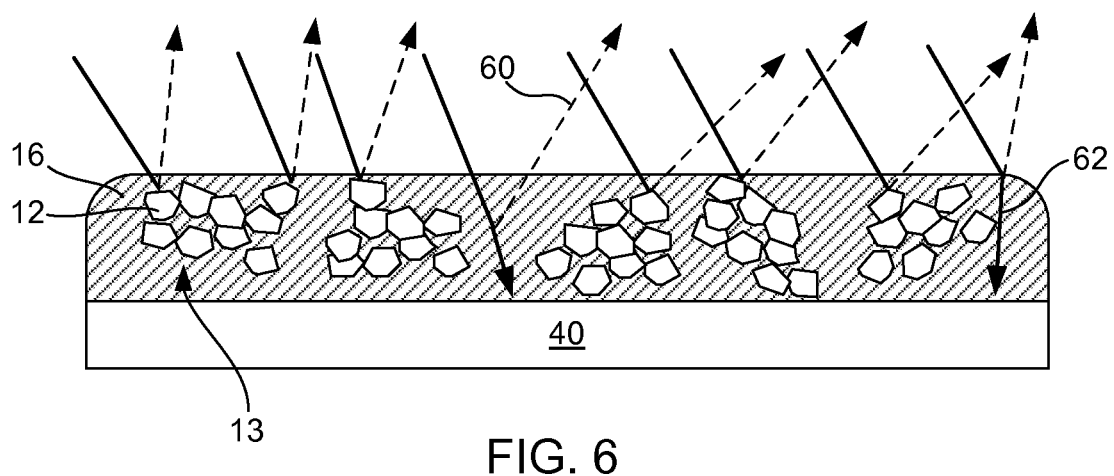
FIG. 6 depicts a printed article, such as that shown in FIG. 2B, after heat fusing on the media substrate in accordance with examples of the present disclosure.

In another example, the image printed or generated in accordance with FIGS. 3 and 4 can be heat fused or otherwise cured (as shown previously in FIG. 2B). More specifically in one example, FIG. 5 shows a heat fusing or curing device 50 which is used to apply heat or electromagnetic energy 52 to the printed article to form a fused printed article as shown in FIG. 6. As shown in FIG. 5, the printed image prior to fusing can include the white metal oxide pigment 12 which is dispersed by dispersants 14a,14b, and the latex particulates 16 provide spacing between white metal oxide pigment particles that are pushed together to form larger particle aggregates 13, such as shown in FIG. 6. Once heat fused, the latex and co-dispersants can become fused together as a polymeric mass 16 in FIG. 6, there can be enhanced light scattering 60 and lower transmittance 62 compared even more densely packed white metal oxide pigment particles, which thus provides enhanced opacity. In other words, this increased opacity can be achieved by optically spacing the white metal oxide pigment particles as aggregates relative to other aggregates.

In accordance with this, a printed article can include up to 80 gsm, or up to 50 gsm, of a total fluids (white ink+fixer) applied to a media substrate. The term "up to 80 gsm" is used because typical inkjet images include fully imaged areas as well as non-imaged and/or lower density areas. After water and solvent(s) evaporation and fusing, the gsm roughly translates into 15-50 wt % of the initial fluid dispersion flux density, i.e. thus less than 60 gsm. In one example, full density inked area may be at from 30 to 60 gsm ink/fixer film, but densities lower in the tone ramp will be lower than this, thus the use of the phrase "up to" 80 gsm or "up to" 60 gsm. That being stated, though some areas on a media substrate might be at 0 gsm under this definition (unprinted areas), there will be areas that are imaged that range from greater than 0 gsm up to 60 gsm (after drying or heat fusing). In a typical printed article, there is a portion of the media that can be printed at from 5 gsm to 60 gsm.

Figure 7:
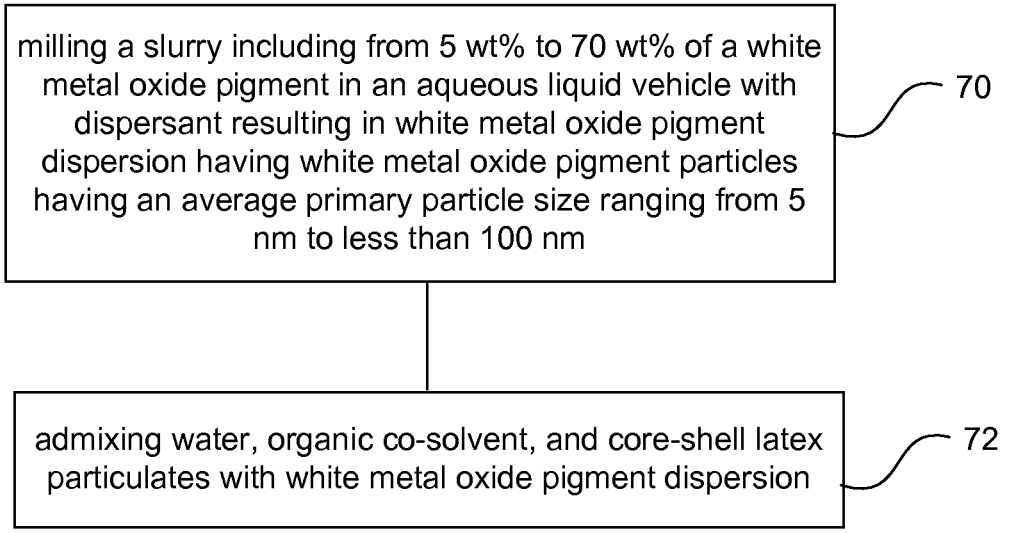
FIG. 7 is a flow chart showing a method of preparing or making a white ink in accordance with examples of the present disclosure.

Preparing the white inks of the present disclosure can be carried out in a number of ways. In one example, a method of making the white inks described herein is shown in FIG. 7. In this example, a method can include milling 70 a slurry including from 5 wt % to 70 wt % of a white metal oxide pigment in an aqueous liquid vehicle with dispersant resulting in white metal oxide pigment dispersion having white metal oxide pigment particles having an average primary particle size ranging from 5 nm to less than 100 nm. The method can also include admixing 72 water, organic co-solvent, and core-shell latex particulates with white metal oxide pigment dispersion.

Turning now to the various specific ingredients that are present in the white ink, there can be a white metal oxide pigment. The "white" pigment provides much of the white coloration to the ink, though without the other ingredients in the ink, individual pigment particles may have some transparency or translucency. Examples of white metal oxide pigments that can be used include titanium dioxide particulates, zinc oxide particulates, zirconium oxide particulates, combinations thereof, or the like. Pigments with high light scatter capabilities when aggregated together, such as these, can be selected to enhance light scattering and lower transmittance, thus increasing opacity. White metal oxide pigments can have a particulate size from about 5 nm to less than 100 nm, and more typically, from about 15 nm to 80 nm, and in still another example, from about 40 nm to 70 nm. The combination of these pigments within these size ranges, appropriately spaced from one another, can be printed with high opacity at relatively thin thickness, e.g., 5 gsm to 50 gsm. Again, the light scattering can occur after removal of water and other solvent(s) from the printed ink and fixer, and after fusing or curing which causes pushing the primary white metal oxide pigment particles together into average aggregate sizes suitable for light scattering, e.g., usually from about 150 nm to about 500 nm in aggregate sizes, though aggregate sizes outside of this range can likewise scatter light effectively.

The white metal oxide pigment, among other solids that may be present, can be dispersed using a dispersant of the present disclosure, e.g., the short-chain anionic dispersant, non-ionic or predominantly non-ionic dispersant, non-ionic or predominantly non-ionic dispersant with a C2 to C10 carboxylic acid with two or more carboxylic acid groups, combinations thereof, and/or other dispersant(s) effective to disperse the pigment. In certain example, the dispersant can be polymeric dispersant or an alkoxysilane dispersant. The dispersant can be present at from 0.005 wt % to 10 wt % of the white ink. In one specific example, a short-chain anionic dispersant can be present in the white ink at from 0.005 wt % to 2 wt %, and can have a weight average molecular weight of 1,000 Mw to 15,000 Mw. In other examples, a non-ionic or predominantly non-ionic dispersant can be present in the white pigment dispersion at from 0.01 wt % to 4 wt %, and/or can have a weight average molecular weight from 500 Mw to 50,000 Mw. These can likewise be used in combination, or other suitable dispersant packages can be used as well.

Suitable short-chain anionic dispersants can be defined as a dispersant with chain length short enough to impact viscosity of ink formulation at moderate concentrations with acid number higher than 100 mg KOH/g based in dry polymer content. Examples of short-chain anionic dispersants include dispersants having a weight average molecular weight lower than 30,000 Mw, or more typically, lower than 15,000 Mw, or lower than 10,000 Mw, e.g., from 1,000 Mw to 30,000 Mw, or from 2,000 Mw go 15,000 Mw, and so forth.

Examples of short-chain anionic dispersants with low weight average molecular weight (Mw) acrylic and methacrylic acids homopolymers such as polyacrylic acid (PAA), polymethacrylic acid (PMAA), or their salts. More specific examples include, but are not limited to, Carbosperse® K-7028 (PAA with M~2,300), Carbosperse® K-752 (PAA with M~2,000), Carbosperse® K-7058 (PAA with M~7,300), Carbosperse® K-732 (PAA with M~6,000), Carbosperse® K-752 (Na salt of PMAA with M~5,000), all available from Lubrizol Corporation. Others include Dispex® AA 4935 available from BASF Dispersions & Pigments Division, as well as Tamol® 945 available from Dow Chemical. Low molecular weight acrylic and methacrylic acid co-polymers with other carboxylic monomer moieties can also be used, such as co-polymers of acrylic and maleic acids available from Kelien Water Purification Technology Co. Low molecular weight co-polymers of carboxylic acid monomers with other water-soluble non-carboxylic acidic monomer moieties, such as sulfonates, styrenesulfonates, phosphates, etc., can also be used. Examples of such dispersants include, but are not limited to, Carbosperse® K-775 and Carbosperse® K-776 (co-polymers of acrylic and sulfonic acid), Carbosperse® K-797, Carbosperse® K-798, or Carbosperse® K-781 (co-polymers of acrylic, sulfonic acid and styrenesulfonic acid), all available from Lubrizol Corporation. Additionally, low molecular weight co-polymers of carboxylic acid monomers with some hydrophobic monomers can likewise be used. Dispersants from this group are suitable here if their acid number (content of hydrophilic acidic moieties in polymer chain) is high enough to make the dispersant well soluble in aqueous phase. Examples of such dispersants include, but are not limited to styrene-acrylic acid copolymers such as Joncryl® 671, Joncryl® 683, Joncryl® 296, or Joncryl® 690, available from BASF, as well as other water soluble styrene-maleic anhydride co-polymer resins.

Suitable non-ionic dispersing agents can allow for suitable dispersibility and stability in an aqueous ink environment, while having little to no impact on the viscosity of the liquid phase of the ink as well as retaining good printhead reliability in thermal inkjet printheads. For definitional purposes, predominantly non-ionic dispersants are also referred to as non-ionic dispersants, provided they are non-ionic or predominantly non-ionic in nature, i.e. the acid number of the predominantly non-ionic/weak anionic dispersant, per dry polymer, is not higher than 100 mg KOH/g, and is typically not higher than 50 mg KOH/g, and most typically not higher than 30 mg KOH/g. That being stated, in one example, non-ionic dispersing agent with no anionic properties can be used.

Examples of non-ionic or predominantly nonionic dispersants that are included in this definition are water-hydrolysable silane coupling agents (SCAs) with relatively short (oligomer length range of not longer than 50 units, not longer than 30 units, or not longer than 15 units, e.g., 10 to 15 units) polyether chain(s), which are also soluble in water. An example of such a dispersant includes Silquest® A1230 polyethylene glycol methoxysilane available from Momentive Performance Materials. Other examples include soluble low-to-midrange M (e.g., usually molecular mass of the polymer less than 15,000 Da) branched co-polymers of comb-type structures with polyether pendant chains and acidic anchor groups attached to the backbone, such as Disperbyk® 190 and Disperbyk® 199 available from BYK Chemie, as well as Dispersogen® PCE available from Clariant. In one example, one or both of Cab-O-Sperse® K-7028 and Disperbyk® 190 can be used.

In further detail regarding the non-ionic dispersants that can be used, in one example, reactive hydrophilic alkoxysilane dispersants that can be present, and examples include, but are not limited to, hydrolysable alkoxysilanes with alkoxy group attached to water-soluble (hydrophilic) moieties, such as water-soluble polyether oligomer chains, phosphate groups, or carboxylic groups. In some examples, the dispersant used to disperse white metal oxide pigment can be a polyether alkoxysilane or polyether phosphate dispersant. Upon dissolution in water with the white metal oxide pigment, the alkoxysilane group of the dispersant often hydrolysis resulting in formation of silanol group. The silanol group, in turn, may react or form hydrogen bonds with hydroxyl groups of metal oxide particle surface, as well as with silanol groups of other dispersant molecules through hydrogen bonding. These reactions lead to bonding or preferential absorption of the dispersant molecules to the metal oxide particle surfaces and also form bonds between dispersant molecules themselves. As a result, these interactions can form thick hydrophilic coatings of reactive dispersant molecules on surface of the white metal oxide pigment. This coating can increase the hydrodynamic radius of the particulates and thus reduce their effective density and settling rate. Furthermore, the dispersant coating prevents agglomeration of the white metal oxide pigment upon settling so that when sediment and settling does occur over time in the ink formulations, the settled white metal oxide pigment remain fluffy and thus are easy to re-disperse upon agitation. In still further detail, these dispersants have a relatively short chain length and do not contribute significantly to the ink viscosity, even with relatively high metal oxide particle loads, e.g. over 25 wt % white metal oxide pigment in the ink.

As mentioned, a suitable alkoxysilane dispersant can have an alkoxysilane group which can be easily hydrolyzed in aqueous environment and produce a silanol group, and a hydrophilic segment. The general structure of the alkoxysilane group is —Si(OR)$_3$, where R most can be methyl, ethyl, n-propyl, isopropyl, or even a longer (branched or unbranched) alkane chain. It is noted that the longer the hydrocarbon (R), the slower hydrolysis rate and rate of interaction with dispersed metal oxide particle surface. In a few highly practical examples, structures with —Si(OR)$_3$ where R is methyl or ethyl can typically be used. The hydrophilic segment of the alkoxysilane dispersant can likewise be large enough (relative to the whole molecule size) in order to enable dispersant solubility in aqueous environment, as well as prevent agglomeration of the white metal oxide pigment. In one example, the hydrophilic segment can be a polyether chain, e.g., polyethylene glycol (PEG) or its co-polymer with polypropylene glycol (PPG). Polyether-based dispersant moieties have clean thermal decomposition, and thus, are good candidates for use. When heated above decomposition temperature, PEG and PPG-based molecules decompose into smaller molecular fragments with high volatility or good water solubility. Thus, their decomposition usually does not form noticeable amounts of solid residue on surface of microscopic heaters used for driving thermal inkjet printheads (which can cause thermal inkjet printheads to fail over time or render them non-operational in some instances).

In further detail, examples polyether alkoxysilane dispersants that may be used to disperse white metal oxide pigment can be represented by the following general Formula (I):

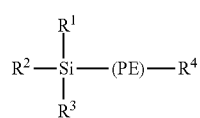

(I)

wherein:

a) R$^1$, R$^2$ and R$^3$ are hydroxy groups, or hydrolyzable linear or branched alkoxy groups. For hydrolyzable alkoxy groups, such groups can have 1 to 3 carbon atoms; in one aspect, such groups can be —OCH$_3$ and —OCH$_2$CH$_3$. In some examples, R$^1$, R$^2$ and R$^3$ are linear alkoxy groups having from 1 to 5 carbon atoms. In some other examples, R$^1$, R$^2$ and R$^3$ groups are —OCH$_3$ or —OC$_2$H$_5$.

b) PE is a polyether oligomer chain segment of the structural formula [(CH$_2$)$_n$—CH(R)—O]$_m$, attached to Si through Si—C bond, wherein n is an integer ranging from 0 to 3, wherein m is an integer superior or equal to 2 and wherein R is H or a chain alkyl group. R can also be a chain alkyl group having 1 to 3 carbon atoms, such as CH$_3$ or C$_2$H$_5$. In some examples, m is an integer ranging from 3 to 30 and, in some other examples, m is an integer ranging from 5 to 15. The polyether chain segment (PE) may include repeating units of polyethylene glycol (PEG) chain segment (—CH$_2$CH$_2$—O—), or polypropylene glycol (PPG) chain segment (—CH$_2$—CH(CH$_3$)—O—), or a mixture of both types. In some examples, the polyether chain segment (PE) contains PEG units (—CH$_2$CH$_2$—O—); and c) R$^4$ is hydrogen, or a linear or a branched alkyl group. In some examples, R$^4$ is an alkyl group having from 1 to 5 carbon atoms.

Other examples of dispersants used to disperse white metal oxide pigment can include polyether alkoxysilane dispersants having the following general Formula (II):

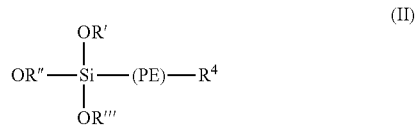

(II)

wherein R', R" and R"' are linear or branched alkyl groups. In some examples, R', R" and R"' are linear alkyl groups having from 1 to 3 carbon atoms in chain length. In some examples, R', R" and R"'—CH$_3$ or —C$_2$H$_5$. R$^4$ and PE are as described above for Formula (I); i.e. PE is a polyether oligomer chain segment of the structural formula: [(CH$_2$)$_n$—CH—R—O]$_m$, wherein n is an integer ranging from 0 to 3, wherein m is an integer superior or equal to 2 and wherein R is H or a chain alkyl group; and R$^4$ is hydrogen, or a linear or a branched alkyl group. In some examples, R$^4$ is CH$_3$ or C$_2$H$_5$.

In some examples, the white metal oxide pigment present in the ink compositions are dispersed with polyether alkoxysilanes. Examples of suitable polyether alkoxysilanes include (CH$_3$O)$_3$Si—(CH$_2$CH$_2$O)$_{n'}$, H; (CH$_3$CH$_2$O)$_3$Si—(CH$_2$CH$_2$O)$_{n'}$,H; (CH$_3$O)$_3$Si—(CH$_2$CH$_2$O)$_{n'}$, CH$_3$; (CH$_3$CH$_2$O)$_3$Si—(CH$_2$CH$_2$O)$_{n'}$, CH$_3$; (CH$_3$O)$_3$Si—(CH$_2$CH$_2$O)$_{n'}$, CH$_2$CH$_3$; (CH$_3$CH$_2$O)$_3$Si—(CH$_2$CH$_2$O)$_{n'}$, CH$_2$CH$_3$; (CH$_3$O)$_3$Si—(CH$_2$CH(CH$_3$)O)$_{n'}$, H; (CH$_3$CH$_2$O)$_3$Si—(CH$_2$CH(CH$_3$)O)$_{n'}$, H; (CH$_3$O)$_3$Si—(CH$_2$CH(CH$_3$)O)$_{n'}$, CH$_3$; (CH$_3$CH$_2$O)$_3$Si—(CH$_2$CH(CH$_3$)O)$_{n'}$, CH$_3$; wherein n' is an integer equal to 2 or greater. In some examples, n' is an integer ranging from 2 to 30 and, in some other examples, n' is an integer ranging from 5 to 15.

Commercial examples of the polyether alkoxysilane dispersants include, but are not limited to, the aforementioned Silquest® A-1230 manufactured by Momentive Performance Materials, and Dynasylan® 4144 manufactured by Evonik/Degussa.

Sometimes, when using a non-ionic or predominantly non-ionic dispersant as described above, a small amount, e.g., 0.05 wt % to 3 wt % based on pigment content, of small molecule (e.g., C2 to C10) carboxylic acid co-dispersant may be used or present during pigment preparation. Such a carboxylic acid additive can include two or more carboxylic acid groups. Examples can include water-soluble dicarboxylic acids such as adipic acid, aspartic acid, gluamic acid, etc., as well as tricarboxylic acids such as citric acid, aconitic acid, propane-1,2,3-tricarboxylic acid, etc. Their presence in the dispersion is usually much lower than of the polyether alkoxysilane dispersant, i.e. from 0.1 wt % to 7 wt % of the white metal oxide pigment.

The total amount of dispersants used to disperse the white metal oxide pigment and other solids may vary from about 0.1% by weight to about 300% by weight of the white metal oxide pigment content. In some examples, the dispersant content range is from about 0.5 to about 150% by weight of the white metal oxide pigment content. In some other examples, the dispersants content range is from about 5 to about 100% by weight of the white metal oxide pigment content.

A dispersion of white metal oxide pigment suitable for forming the white inks of the present disclosure can be prepared via milling metal oxide powder in water in the presence of suitable dispersants. For example, the metal oxide dispersion may be prepared by milling commercially available inorganic oxide pigment having large particulate size (in the several hundred nanometer to micron range) in the presence of the co-dispersant package described above until the desired particulate size is achieved. The starting dispersion to be milled can be an aqueous dispersion with solid content up to 70% by weight of the white metal oxide pigment or pigments. The milling equipment that can be used may be a bead mill, which is a wet grinding machine capable of using very fine beads having diameters of less than 1.0 mm (and, generally, less than 0.5 mm) as the grinding medium, for example, Ultra-Apex Bead Mills from Kotobuki Industries Co. Ltd or MiniCer® bead mill available from NETZSCH Premier Technologies, LLC. The milling duration, rotor speed, and/or temperature may be adjusted to achieve the dispersion particulate size desired. As mentioned, the co-dispersants can include a short-chain anionic dispersant and a non-ionic or predominantly non-ionic dispersant. Thus, the co-dispersants can be milled with the white metal oxide pigment, thereby modifying both particles of the white metal oxide pigment and the surface thereof with the co-dispersants.

In further detail, the white metal oxide pigment can be milled in the presence of dispersant(s), which can generate new surfaces on the white metal oxide pigment (as the size is reduced or as aggregated white metal oxide pigment particles are reduced in size). These new surfaces can be immediately exposed to the co-dispersants, leading to enhanced absorption or adsorption of the co-dispersants to the new surfaces. This process can, in some cases, create a better dispersed white metal oxide pigment because of the strong attraction between the co-dispersants and the newly exposed pigment surface. In one example, preparation of the white pigment dispersion includes milling a slurry sufficiently to reduce an average particle size of the white metal oxide pigment and expose new surfaces of the white metal oxide pigment to the slurry, wherein upon new surfaces being exposed, the co-dispersants are immediately absorbed or adsorbed to the new surfaces thereof at a strength greater than prior to milling. For example, this step of milling the slurry can include milling sufficiently to reduce the average particle size to a size range from 5 nm to less than 100 nm. In one example, the reduction in size during milling can including reducing the white metal oxide pigment by 20% or more during milling in the presence of the dispersant(s).

Turning now to the latex particulates, due to the small size of the white metal oxide pigment particles, there are advantages to adding the core-shell latex particulates to the white inks of the present disclosure. For example, by combining white metal oxide pigment with core-shell latex particulates, opacity can be increased after drying and fusing or curing, as mentioned. In one aspect, a white metal oxide pigment to latex particulate weight ratio can be from 10:1 to 1:5. In another aspect, a white metal oxide pigment to latex particulate weight ratio can be from 5:1 to 1:2. By selecting white metal oxide pigment with a high refractive index (e.g. from 1.8 to 2.8) when primary particles are pushed together into small groupings or pigment aggregates, the opacity of the ink when printed on a media sheet and fused or cured can be unexpectedly increased further compared to an ink without the added latex particulates. In further detail, volume fraction of white metal oxide pigment to core-shell latex can also be considered. For example, a metal oxide pigment to core-shell latex volume ratio 30:70 can provide acceptable results, and in some cases, a volume ratio of 57:43 may provide even better results, i.e. more white opacity, even though there may be more latex than pigment, depending on the pigment content, latex used, etc. Thus, in one example, a white metal oxide pigment to core-shell latex volume ratio can be from 90:10 to 30:70, or from 70:30 to 30:70, or from 70:30 to 50:50.

The core-shell latex particulates can form continuous polymer phase after the ink printing and drying/curing. This polymer phase can form a continuous coating with good mechanical durability, i.e. act as a binder phase. In the absence of the binder in these ink formulations, the printed layer would may not have as much mechanical durability (reduced rub resistance, etc.), and furthermore, would not act to push the white metal oxide pigment particles together for enhanced light scattering.

Thus, combinations of monomers can be used to generate core-shell copolymer latex particulates with a shell having a higher glass transition temperature than the core, and which have a higher affinity in the ink to one another than to the white metal oxide pigments. Forming a core-shell latex polymer can be by any of a number of techniques known in the art, such as: i) grafting a shell polymer onto the surface of a core polymer, ii) copolymerizing various monomers using ratios that lead to a diverse core and shell composition, iii) adding various monomers (or excess of one monomer over another) to generate a core portion and a shell portion that is distinct; iv) sequentially adding second monomer(s) after starting polymerization with first monomer(s) so there is a higher concentration of a second monomer(s) copolymerized at or near the surface, or v) any other method known in the art to generate a more shell polymer that is distinguishable over a core polymer.

To illustrate, in one specific example, a core of butyl acrylate/styrene can be initiated which results in a core polymer having a glass transition temperature of about −15° C. Subsequently, a methyl methacrylate/styrene/butyl acrylate/methacrylic acid (<0.5 wt %) can be copolymerized to form a 90° C. shell polymer which is copolymerized after the core has already started polymerization. In this example, various ratios of core to shell (by weight) can be formed. In one example, the core can be at from 5 wt % to 30 wt % and the shell at 70 wt % to 95 wt %. In this example, the core-shell latex particles at the surface have a greater affinity for the other latex particles compared to the white metal oxide pigment particles, thus encouraging domain formation of clusters of latex aggregate (which in turn pushes the white metal oxide particles together), leading to the increased opacity. This principle is also applicable to other core-shell latex particulates prepared in accordance with examples of the present disclosure.

In certain examples, the core-shell latex particulates may be produced by emulsion polymerization or co-polymerization of acrylic, acrylate, and/or styrene type monomers, e.g., methyl methacrylate, styrene, butyl acrylate, methacrylic acid, etc. In further detail, the list of suitable monomers can include (but is not limited to) C1 to C8 alkyl methacrylates and alkyl acrylates, styrene and substituted methyl styrenes, polyol acrylates and methacrylates such as hydroxyethyl acrylate, acrylic acid, methacrylic acid, polymerizable surfactants, or the like. In further detail, examples of monomers used in the latexes can also be vinyl monomers. The monomers can be, for example, one or more of vinyl monomers (such as vinyl chloride, vinylidene chloride, etc.), vinyl ester monomers, acrylate monomers, methacrylate monomers, styrene monomers, ethylene, maleate esters, fumarate esters, itaconate esters, or mixtures thereof. In one aspect, the monomers can include acrylates, methacrylates, styrenes, or mixtures thereof.

Furthermore, monomers that can be polymerized in forming the latexes include, without limitation (some of which being previously mentioned), styrene, ox-methyl styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, 2-ethylhexyl acrylate, 2-ethylhexyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, isobornyl methacrylate, cyclohexyl methacrylate, trimethyl cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, isobornyl acrylate, dimethyl maleate, dioctyl maleate, acetoacetoxyethyl methacrylate, diacetone acrylamide, N-vinyl imidazole, N-vinylcarbazole, N-Vinyl-caprolactam, combinations thereof, derivatives thereof, or mixtures thereof.

Acidic monomers that can be polymerized in forming latexes include, without limitation, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinyl-succinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, or mixtures thereof.

In one specific example, the acidic monomer content in the latex mix can range from 0.1 wt % to 15 wt % and the balance being non-acidic monomers, with suitable latex particulate sizes range from 50 nm to 300 nm. Glass transition temperatures may range from −20° C. to 130° C., with the shell having a higher glass transition temperature than the core, e.g., core ranging from −20° C. to 30° C. or from −20° C. to 0° C. and the shell ranging from 30° C. to 130° C. or from 70° C. to 130° C. The latex content in the white ink formulations, when present, may range from 2 wt % to 30 wt %, or from 3 wt % to 20 wt %, or more typically from 5 wt % to 15 wt %.

As mentioned, the particulate size of the white metal oxide pigment can be from 5 nm to less than 100 nm, but in other examples, the particulate size can be from 15 nm to 85 nm, or from 40 nm to 70 nm. Such small white metal oxide pigment particles as primary particles are inefficient for light scattering, but when pushed together and spaced appropriately by fused latex, they can provide acceptable light scattering, e.g., from 15 nm to 500 nm aggregates or from 200 nm to 350 nm. The more efficient the light scattering, typically, the more opaque the printed ink layer may be (assuming appropriate spacing in the pigmented layer as described herein). Thus, the white inks of the present disclosure can be formulated such that when printed, the latex particulates or other optical spacers provide an average space between white metal oxide pigment aggregates ranging from 150 nm to 1,000 nm, in one example. In other examples, the average space between white metal oxide pigment aggregates can be 50 nm to 500 nm, from 50 to 300, or in one specific example, about 50 nm to 250 nm.

In further detail, optical spacing can be experimentally evaluated by printing the ink on a media substrate and fusing or curing the ink (e.g., by applying heat at a temperature about 2° C. to 110° C. above the minimum film formation temperature of the latex particulates), and evaluating using Transition Electron Microscopy (TEM) cross-section photo of a printed white ink layer. If the opacity provided by the white ink is not high enough, the ratio of white metal oxide pigment to latex particulates and/or other optical spacers can be adjusted up or down, as effective, or the thickness of the ink can be increased. That being stated, an advantage of the white inks of the present disclosure is that in some instances, thickness does not need to be increased to increase opacity. For example, by appropriately spacing the white metal oxide pigment aggregates formed by fusing the latex, opacity can be boosted from 0.1% to 50%, and more typically, from 5% to 75%.

In addition to assisting with enhanced opacity, as briefly mentioned, the latex particulates can also provide enhanced durability. More specifically, the use of latex particulates, including fusible latex particulates that are thermally or otherwise cured after printing on the media substrate, can provide added durability to the printed image. Thus, the latex can provide the dual role of providing spacing for the white metal oxide pigment aggregates, and can also provide durability on the printed media sheet. This is particularly the case in examples where there may be high metal oxide particle loads. Films formed by hard ceramic particulates such as high refractive index metal oxides on surface of low porosity and non-porous media substrates tend to have very poor mechanical properties. The film-forming behavior of latex particulates described herein can bind the relatively large white metal oxide pigment (with co-dispersants) into continuous coating that can be very durable. Additionally, as mentioned, the low refractive index of the polymer film along with the latex particulates creates low refractive index or "n" domains, i.e. optical spacers between high n white metal oxide pigment particles, thereby enhancing opacity of the print.

Coalescence of latex particulates into continuous phase creates low refractive index domains in the coating. The refractive index of the fused latex in the coating may range from 1.3 to 1.6, and in one example, can be from 1.4 to 1.6, or 1.4 to 1.5. Such a refractive index is contrasted with the white metal oxide pigment aggregates which have a refractive index ranging from 1.8 to 2.8, or from 2.2 to 2.8. Specific examples include zinc oxide (about 2.4), titanium dioxide (about 2.5 to 2.7), zirconium oxide (about 2.4), etc. Typically, the difference in the refractive indexes can be from about 0.2 to 1.5, or more, if possible (typically, the higher is the better), though this is not always the case, as long as there is enough of a difference that the opacity can be increased at least to some degree by the optical spacing and the refractive index difference.

The core-shell latexes can have various shapes, sizes, and molecular weights. In one example, polymer in the latex particulates may have a weight average molecular weight (Mw) of about 5,000 Mw to about 500,000 Mw. In one aspect, the latex particulates can have a weight average molecular weight (Mw) ranging from about 100,000 Mw to about 500,000 Mw. In some other examples, the latex resin has a weight average molecular weight of about 150,000 Mw to 300,000 Mw.

Turning now to the fixer fluid that may be used with the white inks of the present disclosure, cationic polymer can be added to various ink or liquid vehicles to form fixer fluids of various viscosities for various application processes. Cationic polymers that may be used can include guanidinium or fully quaternized ammonium functionalities, such as quaternized polyamine copolymers. In one example, the cationic polymer might not contain primary or secondary ammonium functionalities, such as polyallylamine or polyethylene imine. Generally, for some digital application processes, i.e. thermal inkjet application, the weight average molecular weight (Mw) of the cationic polymer allows viscosity of 1 cP to 25 cP at 25° C., 1 cP to 15 cP at 25° C., or 1 cP to 10 cP at 25° C., as measured on a Brookfield viscometer. Though viscosity outside of this range can be used, particularly for piezo inkjet applications or for analog (non-digital printing) applications, e.g., 1 cP to 35 cP at 25° C. (for piezo inkjet) and 1 cP to 500 cP at 25° C. for analog applications. Typical weight average molecular weight for the cationic polymer can be less than 500,000 $_{Mw}$, and in one aspect, less than 50,000 $_{Mw}$. In another example, cationic polymers can have high charge densities to improve fixing efficiencies. As such, cationic charge densities can be higher than 1000 microequivalents per gram cationic functionality. In one aspect, higher than 4000 microequivalents per gram can be used. Additionally, concentrations can be low to avoid regulatory issues with aquatic toxicity, e.g., from 0.1 wt % to 25 wt %, and in one aspect, 1 wt % to 5 wt %, or in another aspect, from 1 wt % to 2.5 wt %.

In additional detail, classes of cationic polymers that can be used include, but are not limited to, quaternized polyamines, dicyandiamide polycations, diallyldimethyl ammonium chloride copolymers, quaternized dimethylaminoethyl(meth)acrylate polymers, quaternized vinylimidizol polymers, alkyl guanidine polymers, alkoxylated polyethylene imines, and mixtures thereof. It is to be understood that one or more polycations may be used, and that any desirable combination of the polycations can be used. One or more ions of the cationic polyelectrolytes may be ion-exchanged for a nitrate, acetate, mesylate, or other ion. As a non-limiting example, one material is Floquat® FL2350, a quaternized polyamine derived from epichlorohydrin and dimethyl amine, commercially available from SNF Inc.

Typical liquid vehicle, e.g., vehicle for the dispersion, the ink vehicle, or the fixer vehicle formulations, described herein can include water and other ingredients, depending on the application method desired for use. For example, when jetting the ink or fixer, the formulation may include water as well as co-solvents present in total at from 0.1 wt % to 50 wt %, though amounts outside of this range can also be used. An aqueous liquid vehicle for the white metal oxide dispersion may, in some cases, include only water, though other liquid components can be added (or brought in with the other raw components) as well. In each case, surfactants can be present, and if present, can be included at from 0.01 wt % to 10 wt %. The balance of the formulation can further include or other vehicle components known in the art, such as biocides, viscosity modifiers, materials for pH adjustment, sequestering agents, preservatives, and the like. Typically, an ink vehicle can include water as one of a major solvent. It is noted that the fixer fluid may be formulated for inkjet application or for analog coating processes, and thus, the ingredients and concentrations for such different applications can vary widely. For example, a thicker slurry may be used for analog application, or a less viscous fluid may be used for digital application.

Apart from water, the liquid vehicle can, in some formulations, include high boiling solvents and/or humectants such as aliphatic alcohols, aromatic alcohols, diols, glycol ethers, polyglycol ethers, 2-pyrrolidinones, caprolactams, formamides, acetamides, and long chain alcohols. Examples of such compounds include but are not limited to 2-pyrrolidinone and 2-methyl-1,3-propanediol. The concentration range for high boiling solvents and/or humectants in the ink can be from 0.1 wt % to 30 wt %, depending on the printhead jetting architecture, though amounts outside of this range can also be used.

Classes of co-solvents that can be used can include organic co-solvents including aliphatic alcohols, aromatic alcohols, diols, glycol ethers, polyglycol ethers, 2-pyrrolidinones, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like.

Consistent with the formulation of this disclosure, various other additives may be employed to enhance the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0.01 wt % to 2 wt %, for example, can be used. Viscosity modifiers and buffers may also be present, as well as other additives known to those skilled in the art to modify properties of the ink as desired. Such additives can be present at from 0.01 wt % to 20 wt %.

It is noted that when discussing the present inks and/or methods, each of these discussions can be considered applicable to each of these embodiments, whether or not they are explicitly discussed in the context of that embodiment. Thus, for example, in discussing refractive index related to a composition or the opacity in the context of the white ink, such elements are also relevant to and directly supported in the context of the methods described herein, and vice versa.

It is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is be noted that, as used in this specification and the appended claims, the singular forms "a," "an," and "the" include plural referents unless the context clearly dictates otherwise.

The term "white metal oxide pigment" refers to pigments that impart a white color to a ink or a printed media substrate, particularly when the small primary pigment particles described herein are pushed together to form pigment aggregates and fused or cured in a latex matrix. These "white" metal oxide pigments when viewed alone as primary particles, however, may in fact be essentially colorless or colorless pigments with a high refractive index, e.g., greater than 1.6 or greater than 1.8. For Example, titanium dioxide ($TiO_2$) is an example of such a pigment that imparts some white appearance as an ink and even a stronger white appearance as pigment aggregates. Thus, the term "white metal oxide pigment" includes pigments that are colorless or essentially colorless, but which when formulated and/or printed in accordance with examples of the present disclosure, provide a white appearance.

The term "white ink" refers to inks that have a white appearance as an ink per se in some case, but in each case, after printing on a media substrate and fused or cured causing the white metal oxide pigments to aggregate and scatter light.

The term "primary" when referring to a pigment particle refers to each individual pigment particle, not the aggregated or clumped pigment clusters that can form when primary particles are associated with one another.

The term "aggregate" or "aggregated" when referring to pigment particles refers to pigment clusters that can be present in inks or which are pushed together by fused or cured latex to form clusters, depending on the context.

The term "dispersant" refers to a dispersion packing including one or more dispersing agent. Specifically, the dispersant can include any dispersant described herein that is effective for dispersing the white metal oxide pigment. In certain specific examples, the dispersant can include a polymeric dispersant or an alkoxysilane dispersant. In other examples, the dispersant can include a short-chain anionic dispersant having a weight average molecular weight ranging from 1,000 Mw to 30,000 Mw, e.g., such as with an acid number higher than 100 mg KOH/g based on dry polymer weight, a non-ionic or predominantly non-ionic dispersant having an acid number not higher than 100 mg KOH/g based on dry polymer weight, a non-ionic or predominantly non-ionic dispersant having an acid number not higher than 100 mg KOH/g combined with a C2-C10 carboxylic acid having two or more carboxylic groups, or combinations thereof.

The term "core-shell" when referring to the core-shell latex particulates means that the compositional makeup of the core is different that the compositional makeup of the shell. In one example, the shell can be more hydrophilic than the core. In another example, the core-shell latex particulates have an average glass transition temperature from −20° C. to 130° C., but the glass transition temperature of the shell is higher than the glass transition temperature of the core, e.g., core Tg ranging from −20° C. to 30° C. or from −20° C. to 0° C. and the shell Tg ranging from 30° C. to 130° C. or from 70° C. to 130° C. In another example, the shell has a greater affinity for other core-shell latex particulates than with the white metal oxide pigment particles.

When referring to the relationship between the white metal oxide pigment and the dispersant, the dispersant can be said to be "associated" with a surface of the pigment. In some examples the association can be by adsorption on the surface or by a chemical reaction. In one example, however, the association is by surface attraction and/or adsorption.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Furthermore, it is understood that any reference to open ended transition phrases such "comprising" or "including" directly supports the use of other know, less open ended, transition phrases such as "consisting of" or "consisting essentially of" and vice versa.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. Additionally, a numerical range with a lower end of "0" can include a sub-range using "0.1" as the lower end point.

EXAMPLES

The following illustrates some examples of the disclosed white inks, fluid sets, and methods that are presently known. However, it is to be understood that the following are only exemplary or illustrative of the application of the principles of the present disclosure. Numerous modifications and alternative examples may be devised by those skilled in the art without departing from the spirit and scope of the present compositions and methods. Thus, while the present formulations have been described above with particularity, the following provides further detail in connection with what are presently deemed to be the acceptable examples.

Example 1—White Ink Formulations and Controls

Four inkjettable fluids were prepared as shown in Table 1. Specifically, two controls (Control 1 and Control 2) were prepared. Additionally, two white inks prepared in accordance with examples of the present disclosure (White Ink 1 and White Ink 2) were also formulated. Control 1 did not include a white metal oxide pigment. Control 2 did not include a core-shell latex. White Ink 1 had a 30:70 white metal oxide pigment to core-shell latex volume ratio. White Ink 2 had a 57:43 white metal oxide pigment to core-shell latex ratio.

TABLE 1

| Components | Control 1 (wt %) | Control 2 (wt %) | White Ink 1 (wt %) | White Ink 2 (wt %) |
| --- | --- | --- | --- | --- |
| 2-methyl-1,3-propanediol | 9 | 9 | 9 | 9 |
| 2-Pyrrolidinone | 16 | 16 | 16 | 16 |
| [1]Tergitol ® 15-S-7 (Nonionic Surfactant 90 wt % actives[4]) | 1 | 1 | 1 | 1 |
| [1]Capstone ® FS-35 (Fluorosurfactant 25.3 wt % actives[4]) | 1.98 | 1.98 | 1.98 | 1.98 |
| [1]Tergitol ® TMN-6 (Nonionic Surfactant 90 wt % actives[4]) | 1 | 1 | 1 | 1 |
| Core-shell latex particulates (butyl acrylate and styrene core; and methyl methacrylate/ styrene/butyl acrylate/ | 21.74 | — | 21.74 | 9.66 |

TABLE 1-continued

| Components | Control 1 (wt %) | Control 2 (wt %) | White Ink 1 (wt %) | White Ink 2 (wt %) |
|---|---|---|---|---|
| methacrylic acid shell - 41.4 wt % actives[4]) | | | | |
| [2]P-25 $TiO_2$ (50 nm) dispersed with 15 wt % [3]Silquest ® A-1230 (non-ionic or predominantly nonionic dispersant) and 1 wt % Citric Acid per pigment content (40.6 wt % [4]actives) | — | 36.95 | 36.95 | 49.26 |
| Water | 49.28 | 34.08 | 12.33 | 12.10 |
| Total | 100 | 100 | 100 | 100 |

[1]from Dow Chemical
[2]from Degussa
[3]from Momentive
[4]Note that some components listed above do not include 100 wt % of the active component, i.e. they have other ingredients present such as water or other carrier, etc. Thus, the "actives" can be used to determine the actual percentage of a specific ingredient is present the final formulation. For example, if a component is added at 50 wt % and has 80 wt % actives, then 40 wt % of the active component is actually present in the final composition.

Example 2

Figure 8:
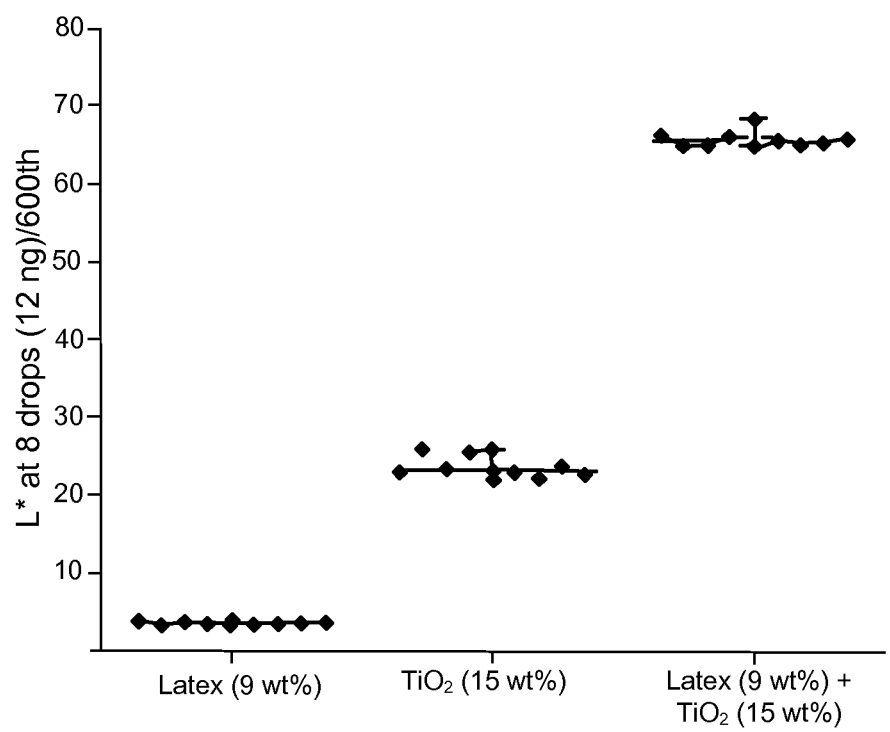
FIG. 8 is a plot graph showing the L* values for print opacity from a black and white image in accordance with examples of the present disclosure.

Control 1, Control 2, and White Ink 1 as described in Table 1 were printed from HP 792 printhead with "HP OfficeJet® 8000 printer" onto black vinyl media at ink coverage density approximately 52 gsm. The prints were cured by blow dryer at temperature ~100-120° C. The photo showed that Controls 1 and 2 performed less favorably compared to White Ink 1. As noted, Control 1 provided almost no white opacity when printed on a black substrate. On the other hand, because of the presence of the white metal oxide pigment (but no core-shell latex to push the small pigment particles together), some white opacity was achieved, but not to an acceptable degree. Only White Ink 1 in this comparison provided an acceptably white opaque image. FIG. 8 depicts the measured L* values for the print generated, i.e. the higher the L* value the lighter (whiter) the coloration of the print.

Example 3

Figure 9:
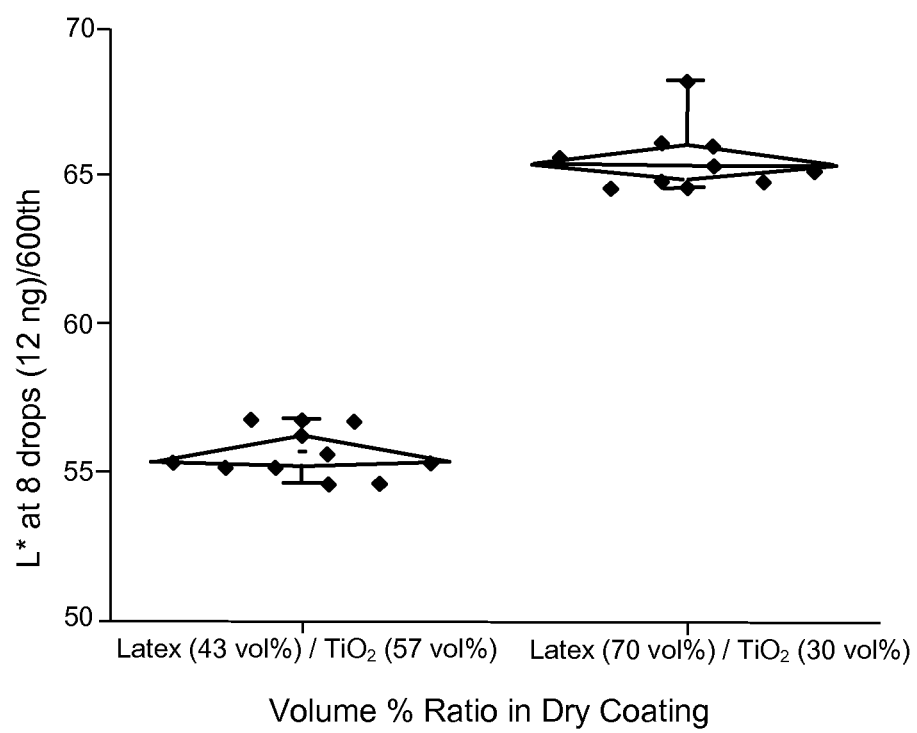
FIG. 9 is a plot graph showing the L* values for two white inks, each with a different white metal oxide pigment to core-shell latex particulate volume fraction ratio in accordance with examples of the present disclosure.

Based on Example 2 where it was established that the use of both a core-shell latex and small white metal oxide pigment can still generate white opaque images, a study was conducted to compare two different volume ratios of white metal oxide pigment to core-shell latex. In this example, White Ink 1 and White Ink 2 as described in Table 1 were printed from HP 792 printhead with "HP OfficeJet® 8000 printer" onto black vinyl media at ink coverage density approximately 52 gsm. The prints were cured by blow dryer at temperature ~100-120° C. to study the impact of white metal oxide pigment to core-shell latex volume fraction ratio in a dry coating on print opacity performance. As can be seen in FIG. 9, surprisingly, a lower white metal oxide pigment to core-shell latex load actually produced more opacity, or a higher L* value. More specifically, the plot shown in FIG. 9 illustrates this dependency as the White Ink containing 15 wt % of $TiO_2$ 50 nm particles and 9 wt % of acrylic latex (MeOx:Latex volume ratio=30:70) produced much higher print opacity than ink containing 25 wt % of $TiO_2$ 50 nm particles and 5 wt % of acrylic latex (MeOx:Latex volume ratio=57:43) in spite of having much lower content of $TiO_2$ pigment.

The opacity of the white coatings produced from these white inks can be dependent not only on content of high refractive index (n) white metal oxide pigment content, but also on ratio of its volume fraction to that of the polymer core-shell latex present. If volume fraction of polymer latex in ink formulation is close or even higher than volume fraction of the white metal oxide pigment, then the core-shell latex tends to produce continuous polymer phase that separates the various clusters or aggregates of white metal oxide pigment particles. In turn, these white inks can facilitate, upon curing or heating, agglomeration of the small metal oxide pigment particles into larger light-scattering clusters and drives opacity of the coating up.

The disclosure has been described with reference to certain embodiments, those skilled in the art will appreciate that various modifications, changes, omissions, and substitutions can be made without departing from the spirit of the disclosure. It is intended, therefore, that the present disclosure be limited only by the scope of the following claims

What is claimed is:

1. A white ink, comprising:
   an aqueous liquid vehicle;
   from 5 wt % to 70 wt % of a white metal oxide pigment having an average primary particle size from 5 nm to less than 100 nm;
   from 0.005 wt % to 10 wt % dispersant associated with a surface of the white metal oxide pigment; and
   from 2 wt % to 30 wt % core-shell particulates, wherein a shell of the core-shell latex particulates has a higher glass transition temperature (Tg) than a core of the core-shell latex particulates, and wherein the core of the core-shell latex particulates has a glass transition temperature from −20° C. to 30° C.

2. The white ink of claim 1, wherein the white metal oxide pigment has the average primary particle size from 15 nm to 80 nm.

3. The white ink of claim 1, wherein the white metal oxide pigment includes titanium dioxide particulates, zinc oxide particulates, zirconium oxide particulates, or combinations thereof.

4. The white ink of claim 1, wherein the core-shell latex particulates have an average glass transition temperature from −20° C. to 130° C. and the shell of the core-shell latex particulates has a greater affinity for other core-shell latex particulates than the white metal oxide pigment.

5. The white ink of claim 1, wherein the white metal oxide pigment and the core-shell latex particulates are present in the white ink at a weight ratio from 10:1 to 1:5.

6. The white ink of claim 1, wherein the white metal oxide pigment and the core-shell latex particulates are present in the white ink at a weight ratio from 5:1 to 1:2.

7. The white ink of claim 1, wherein a volume fraction of the white metal oxide pigment to the core-shell latex particulates is from 90:10 to 30:70.

8. The white ink of claim 1, wherein the dispersant comprises a short-chain anionic dispersant having a weight average molecular weight ranging from 1,000 Mw to 30,000 Mw, a non-ionic or predominantly non-ionic dispersant having an acid number not higher than 100 mg KOH/g, a non-ionic or predominantly non-ionic dispersant having an acid number not higher than 100 mg KOH/g and a C2-C10 carboxylic acid having two or more carboxylic groups, or combinations thereof.

9. A method of making a white ink, comprising
   milling a slurry including a white metal oxide pigment in an aqueous liquid vehicle with dispersant resulting in metal oxide pigment dispersion having white metal oxide pigment with an average primary particle size ranging from 5 nm to less than 100 nm; and admixing water, organic co-solvent, and core-shell latex particulates with the white metal oxide pigment dispersion, to prepare a white ink, wherein the white ink comprises:

the aqueous liquid vehicle;

from 5 wt % to 70 wt % of the white metal oxide pigment;

from 0.005 wt % to 10 wt % dispersant associated with a surface of the white metal oxide pigment; and from 2 wt % to 30 wt % of the core-shell particulates, wherein a shell of the core-shell latex particulates has a higher glass transition temperature (Tg) than a core of the core-shell latex particulates, and wherein the core of the core-shell latex particulates has a glass transition temperature from −20° C. to 30° C.

10. The method of claim 9, wherein the white ink comprises:

from 5 wt % to 50 wt % of the white metal oxide pigment having an average primary particle size from 15 nm to 80 nm; and wherein the core-shell latex particulates have an average glass transition temperature from −20° C. to 130° C., and the shell of the core-shell latex particulates has a greater affinity for other core-shell latex particulates than the white metal oxide pigment.

11. A fluid set for inkjet imaging, comprising the white ink according to claim 1, and a fixer fluid, comprising:

an aqueous fixer vehicle, and from 0.1 wt % to 25 wt % cationic polymer.

12. The fluid set of claim 11, wherein the fixer fluid is formulated for inkjet application having a viscosity from 1 cP to 35 cP at 25° C.

13. The fluid set of claim 11, wherein the fixer fluid is formulated for analog application having a viscosity from 1 cP to 500 cP at 25° C.

14. The fluid set of claim 11, wherein:

the white metal oxide pigment has the average primary particle size from 15 nm to 80 nm and is selected from titanium dioxide particulates, zinc oxide particulates, zirconium oxide particulates, or combinations thereof;

the white metal oxide pigment and the core-shell latex particulates are present in the white ink at a weight ratio from 10:1 to 1:5; and the dispersant comprises a short-chain anionic dispersant having a weight average molecular weight ranging from 1,000 Mw to 30,000 Mw, a non-ionic or predominantly non-ionic dispersant having an acid number not higher than 100 mg KOH/g, a non-ionic or predominantly non-ionic dispersant having an acid number not higher than 100 mg KOH/g combined with a C2 to C10 carboxylic acid having two or more carboxylic groups, or a combination thereof.

15. The white ink of claim 1, wherein the core of the core-shell latex particulates includes a butyl acrylate/styrene and the shell of the core-shell latex particulates includes a copolymer of methyl methacrylate/styrene/butyl acrylate/methacrylic acid.

16. The fluid set of claim 11, wherein the core of the core-shell latex particulates of the white ink includes a butyl acrylate/styrene and the shell of the core-shell latex particulates of the white ink includes a copolymer of methyl methacrylate/styrene/butyl acrylate/methacrylic acid.

* * * * *